United States Patent
Paybins et al.

(10) Patent No.: US 9,254,021 B2
(45) Date of Patent: Feb. 9, 2016

(54) COMBINATION CANE AND GRABBER DEVICE AND A METHOD FOR ITS USE

(71) Applicants: George A. Paybins, Nazareth, PA (US); Sara M Paybins, Nazareth, PA (US)

(72) Inventors: George A. Paybins, Nazareth, PA (US); Sara M Paybins, Nazareth, PA (US)

( * ) Notice: Subject to any disclaimer, the term of this patent is extended or adjusted under 35 U.S.C. 154(b) by 0 days.

(21) Appl. No.: 14/170,911

(22) Filed: Feb. 3, 2014

(65) Prior Publication Data

US 2015/0216272 A1 Aug. 6, 2015

(51) Int. Cl.
*A45B 3/00* (2006.01)
*A45B 3/04* (2006.01)
*A61H 3/00* (2006.01)
*B25J 1/04* (2006.01)

(52) U.S. Cl.
CPC ...... *A45B 3/00* (2013.01); *A45B 3/04* (2013.01); *A61H 3/00* (2013.01); *B25J 1/04* (2013.01)

(58) Field of Classification Search
CPC .............. A45B 3/00; A61H 2003/002; A61H 2003/0222; B25B 9/00; A63B 47/02
USPC ............ 135/66; 294/209, 99.1, 100, 111, 115
See application file for complete search history.

(56) References Cited

U.S. PATENT DOCUMENTS

| | | | | |
|---|---|---|---|---|
| 1,375,912 A * | 4/1921 | Huddle | | 135/65 |
| 2,346,038 A * | 4/1944 | Mason | | 294/104 |
| 3,265,429 A | 8/1966 | Shatt | | |
| 3,467,116 A * | 9/1969 | Ringewaldt | | 294/100 |
| 3,527,492 A * | 9/1970 | Hollis | | 294/115 |
| 4,027,687 A * | 6/1977 | McGowan | | 135/66 |
| 4,556,075 A * | 12/1985 | Hoffman | | 135/65 |
| 4,827,956 A * | 5/1989 | Toot | | 135/66 |
| 4,962,957 A * | 10/1990 | Traber | | 294/100 |
| 5,176,160 A | 1/1993 | Osborn | | |
| 5,433,551 A * | 7/1995 | Gordon | | 403/377 |
| 5,577,785 A * | 11/1996 | Traber et al. | | 294/100 |
| 5,636,650 A * | 6/1997 | Kroeze | | 135/66 |
| 6,058,953 A | 5/2000 | Stefanelli | | |
| 6,386,216 B1 | 5/2002 | Cubelli | | |
| 6,527,321 B1 | 3/2003 | Kuciauskas | | |
| 6,550,490 B1 | 4/2003 | Morton | | |
| 7,021,324 B1 * | 4/2006 | Clay et al. | | 135/67 |
| 7,243,668 B1 * | 7/2007 | Kroeze | | 135/77 |
| 7,360,548 B1 | 4/2008 | Hinca | | |
| 7,624,746 B2 | 12/2009 | Blake | | |
| 7,934,756 B2 * | 5/2011 | Kroeze | | 294/210 |
| 8,122,900 B1 | 2/2012 | Hayes | | |
| 8,714,170 B1 * | 5/2014 | Bonne et al. | | 135/66 |
| 2006/0266397 A1 * | 11/2006 | Berl | | 135/70 |
| 2007/0085358 A1 * | 4/2007 | Robinson et al. | | 294/19.1 |
| 2008/0128009 A1 * | 6/2008 | Blake | | 135/75 |
| 2008/0224488 A1 * | 9/2008 | Khubani | | 294/19.1 |
| 2009/0032077 A1 * | 2/2009 | Hines | | 135/66 |
| 2011/0226296 A1 * | 9/2011 | Huggins | | 135/66 |

* cited by examiner

*Primary Examiner* — Noah Chandler Hawk
(74) *Attorney, Agent, or Firm* — Muskin & Farmer, LLC; Shawn R. Farmer; Jonathan H. Muskin

(57) ABSTRACT

The present cane and grabber device can be a cane component and a grabber component. The grabber component can be housed within the cane component or can be unsheathed from the cane component and utilized to grab one or more objects. In an embodiment, the cane component can provide support to a user both while housing the grabber component and while the grabber component has been unsheathed. In an alternative embodiment, one or more grabber components can be housed by a walker or other similar support providing device.

6 Claims, 6 Drawing Sheets

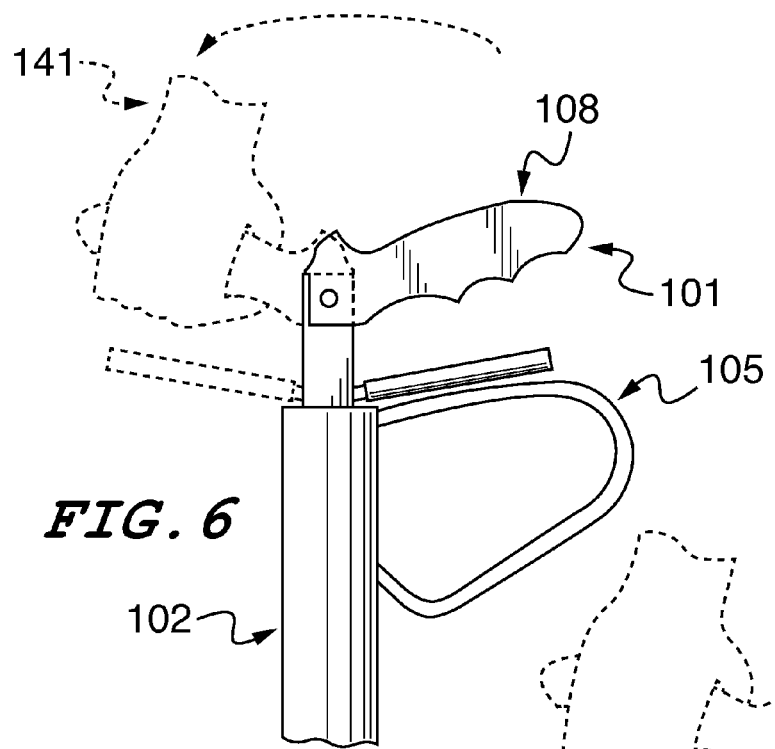
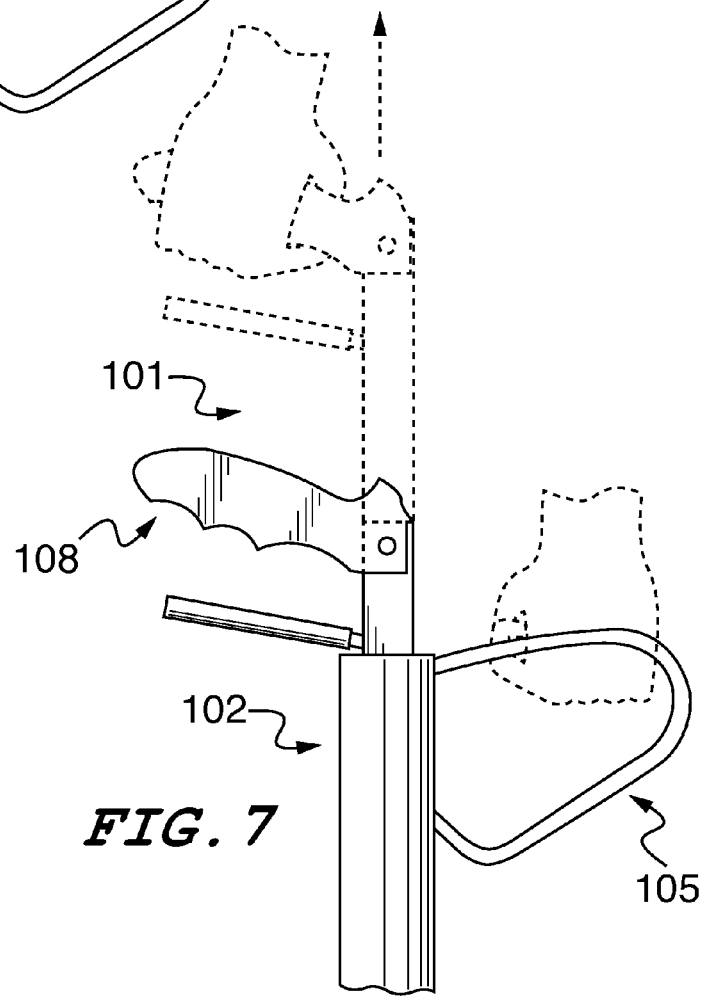

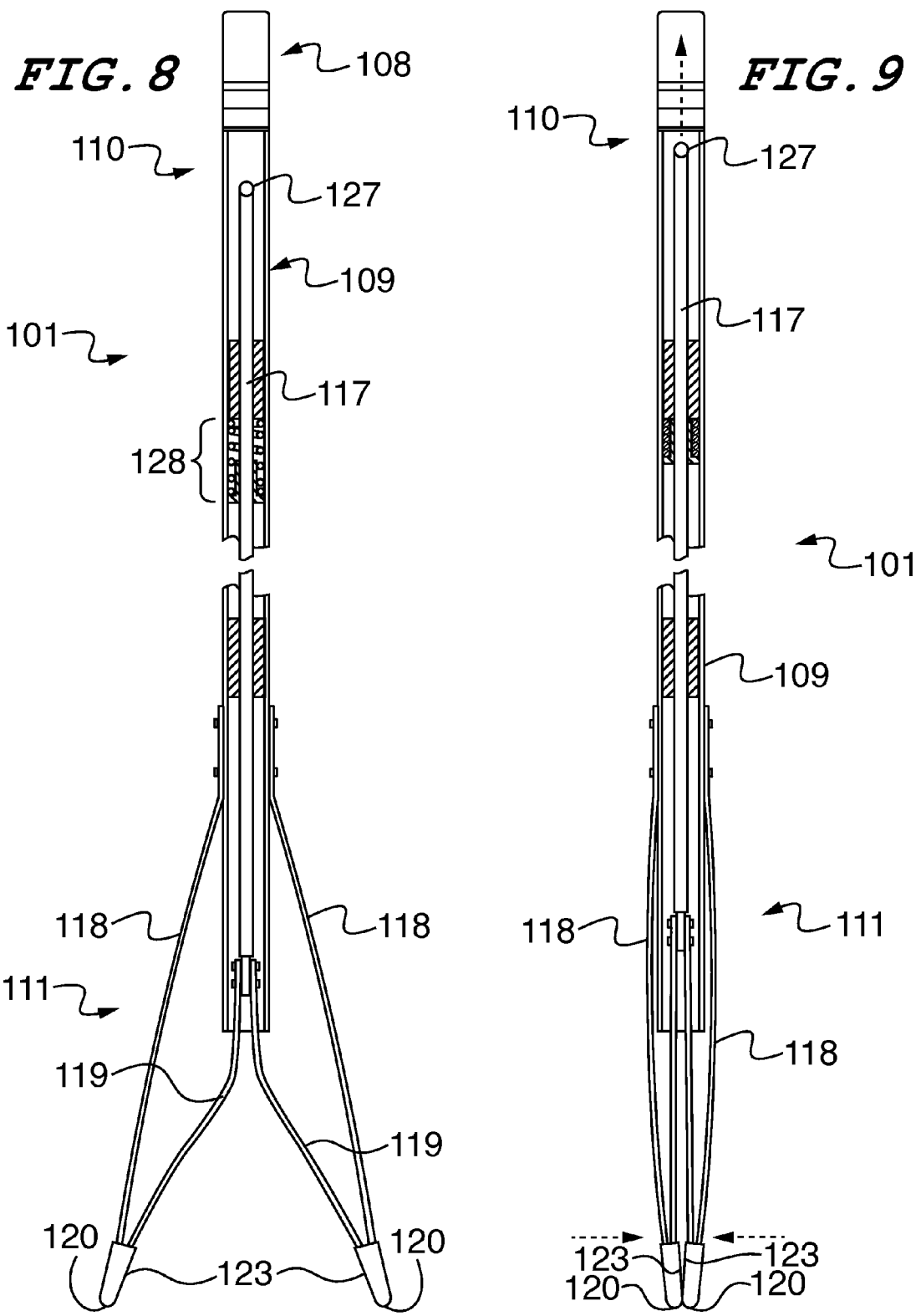

COMBINATION CANE AND GRABBER DEVICE AND A METHOD FOR ITS USE

FIELD OF THE INVENTION

The present device relates to tools that can be used to grasp and collect items while simultaneously assisting a user to stand by providing support to said user, and a method for using such tools.

BACKGROUND

Having the ability to manually grasp objects is an important function in most individuals' normal day-to-day living. Unfortunately, due to disability or age, a person may not have the mobility or flexibility needed to reach items that are located at ground level or on high perches without assistance. For those living without others' support, a tool is required to reach items that are not within grabbing distance from the individual.

Many mechanisms have been devised, which are intended to assist a person with limited mobility to grasp items out of his or her reach. These previous solutions allow persons to extend their reach by multiple feet without needing to bend at the spine or rise from a sitting position. Grasping the grabber in one hand, contraction of the hand is transferred mechanically down a mechanism, wherein a gripping mechanism, usually in the form of a claw, pincer, tab, or suction cup, secures the desired item. The user then merely needs to retract the grabbing device and obtain the captured item from its distal end.

Because many of the individuals who require the aid of a grabber device, such as that described above, have need of it due to decreased mobility, those users have also required a cane or other support in order to be ambulatory. To avoid the need to carry a cane in one hand and a grabber in the other, a device was created that included grabber elements, while still providing distal support in order to be used as a weight-bearing device when not utilized to grab a desired item. However, grabbing an item using a device such as this would leave the user without any means of support. Furthermore, the use of such a grabbing device to reach out away from the user's body and hold an object at the end of this elongated grabbing object would only further tax the user's ability to balance and support himself or herself. The use of such an object would create a dangerous lack of stability in a user who likely already suffers from decreased balance and mobility due to age or disability. Such a lack of support, when support is needed most, could lead to slips and falls that would be severely detrimental to the individual's health.

What is needed is a device that could allow the user the functionality of a grabber, while still maintaining the support of a cane. Specifically, this device should allow one person to grasp an object that is out of their reach without requiring the assistance of another person, but without putting the user in harm's way. Furthermore, this device should be compact and motile enough to allow an individual with decreased mobility and strength to be able to utilize it throughout the course of the average day.

SUMMARY OF THE INVENTION

The above aspects can be obtained by a combination support and grabber tool comprising: a cane component comprising a hollow body section, having a proximate end and a distal end, said proximate end being defined by a rim; a grabber component comprising a grabber body, having a grasping end and a gripping end, wherein the grabber component is configured to fit within the hollow body section of the cane component. The distal end of the cane component can be covered by a non-slip cap. The cane component can further comprise a cane handle, attached to the proximate end of the cane component.

The grabber component can further comprise a grabber handle and a grasping handle, with said grabber handle attached above said grasping handle at the grasping end. The grasping end of the grabber component can further comprise a pincer device, an articulation device, or a hooking device. The grasping end can power the gripping end mechanically or electrically. The grabber component can further comprise an illumination device, attached to the grasping end of the grabber component.

The above aspects can also be obtained by a combination walker and grabber tool, comprising: a walker component comprising at least three legs, each of said legs further comprising a hollow body section, a proximate end, and a distal end; a grabber component comprising a grabber body, having a grasping end and a gripping end, where in the grabber component is configured to fit within the hollow body section of the walker component. The distal ends of said legs can be covered by non-slip caps.

The grabber component can further comprise a grabber handle and a grasping handle, with said grabber handle attached above said grasping handle at the grasping end. The grasping end of the grabber component can further comprise a pincer device, an articulation device, or a hooking device. The grasping end can power the gripping end mechanically or electrically. The grabber component can further comprise an illumination device, attached to the grasping end of the grabber component.

The above aspects can also be obtained by a method of using a combination cane and grabber device, comprising the steps of: obtaining a combination cane and grabber device; holding the cane component in one hand; holding the grabber component in the other hand; pulling the grabber component apart from the cane component; using the grabber component to obtain a desired object while supporting bodyweight with the cane component; repeating the last step as needed; and sheathing the grabber component within the cane component

A BRIEF DESCRIPTION OF THE DRAWINGS

Further features and advantages of the present device, as well as the structure and operation of various embodiments of the present device, will become apparent and more readily appreciated from the following description of the preferred embodiments, taken in conjunction with the accompanying drawings of which:

FIG. 6 is a perspective view of a combination cane and grabber tool according to an embodiment, demonstrating the initial step of separating the cane and grabber components;

FIG. 7 is a perspective view of a combination cane and grabber tool according to an embodiment, demonstrating the separation of the cane and grabber components;

FIG. 8 is a front view of a combination cane and grabber tool, wherein the cane component has been removed and a grabber component remains and is at rest, according to an embodiment;

FIG. 9 is a front view of a combination cane and grabber tool, wherein the cane component has been removed and a grabber component remains and is in operation, according to an embodiment;

DETAILED DESCRIPTION

Figure 1:
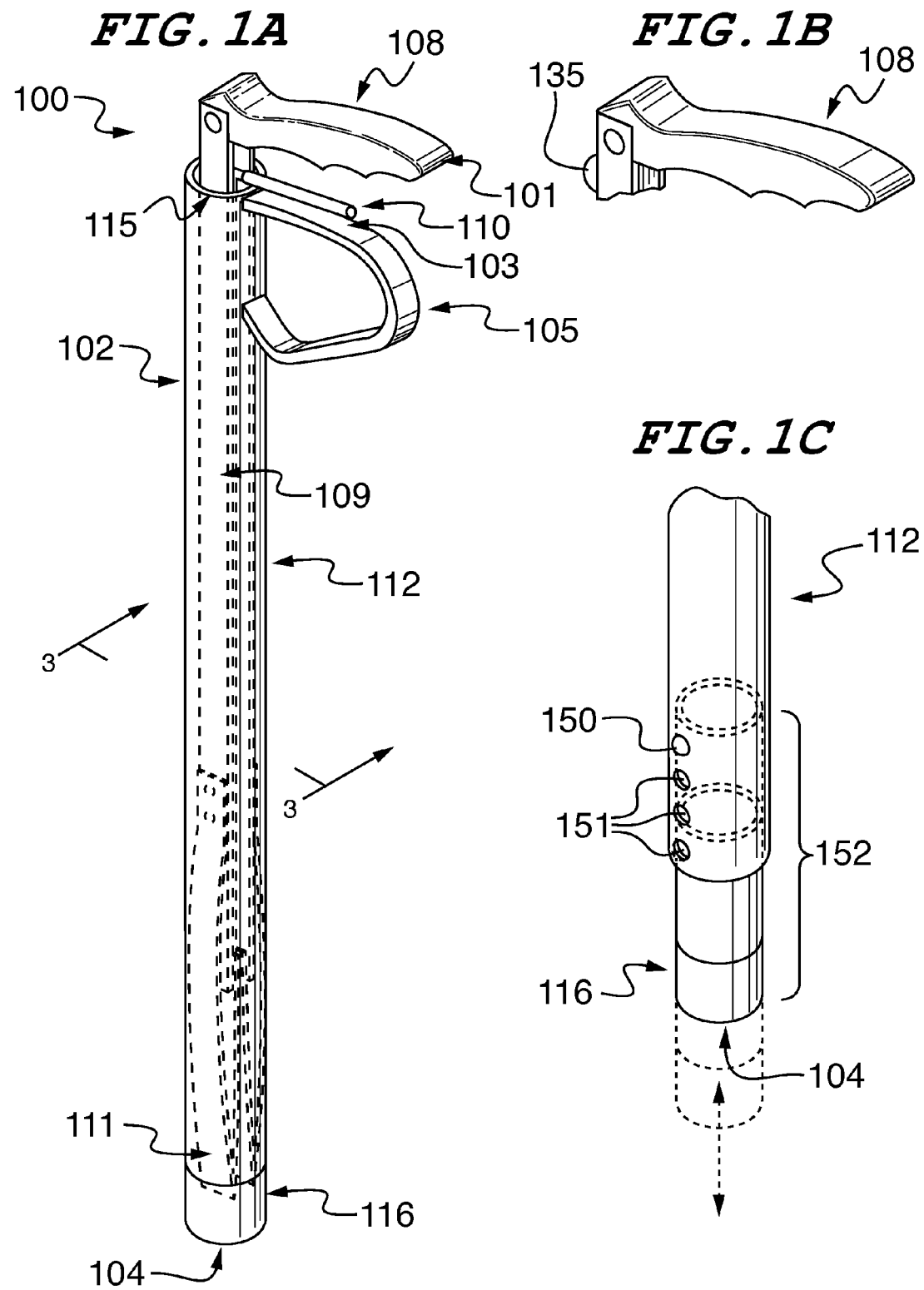
FIG. 1a is a perspective view of a combination cane and grabber tool according to an embodiment.
FIG. 1b is a perspective view of a grabbing handle of a combination cane and grabber tool according to an embodiment.
FIG. 1c is a perspective view of a distal end of a combination cane and grabber tool according to an embodiment.

This description of the exemplary embodiments is intended to be read in connection with the accompanying drawings, which are to be considered part of the entire written description. In the description, relative terms such as "lower," "upper," "horizontal," "vertical,", "above," "below," "up," "down," "top" and "bottom" as well as derivatives thereof (e.g., "horizontally," "downwardly," "upwardly," etc.) should be construed to refer to the orientation as then described or as shown in the drawing under discussion. These relative terms are for convenience of description and do not require that the apparatus be constructed or operated in a particular orientation. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise.

The present combination cane and grabber tool is designed to aid a user in grabbing a desired item, while allowing the user to continue to support him or herself as the object is obtained. Specifically, the combination tool can act as a means of aiding normal ambulation to enable an elderly or disabled individual to maintain an adequate standard of living, while also having the ability to separate into two component parts, one which supports the user as the other component is used to reach and grasp the desired object. According to an embodiment, the present device can comprise a grabbing component and a cane component. In an embodiment, the grabbing component comprises a grasping mechanism, which manipulates manually to provide a tension force that is mechanically translated to the gripping mechanism located on the other end of the grabbing component. By closing and opening the hand, the user can grab objects at a significantly greater distance than would otherwise be available through the use of the user's arms. The grabbing component can also comprise an illumination source.

In an embodiment, the combination device also comprises a cane component. The cane component can be a hollow cylindrical structure made of a metal, plastic, or composite material. The distal end of the cane component can be closed and covered with a non-slip material. The cane component can be extended in length by a peg and hole apparatus located at its distal end. The proximal end of the cane component can be open, and comprise a handle, which can be made of the same material, configured to provide support to the user while using the grabber component.

In an embodiment, the grabber component can be stored within the cane component while not in use, allowing the user to utilize the combined device as a cane support. For use, the individual applies a pulling motion to the handle of the grabber component, which can unsheathe the grabber component from the cane component, and free the grabber component for use, while leaving the cane component available for support. When finished, the user can replace the grabber component within the cane component, and the combination device can once again becomes a cane support system. In an embodiment, this combination cane and grabber tool can be approximately 100 centimeters, but can be made to be any length suitable for the user.

According to an alternate embodiment, the cane component of the combination tool can be incorporated into a walking support system, wherein the cane component can comprise a leg of a walker structure. In an embodiment, the grabber component can be stored in and removed from the cane component in the same manner as previously described when discussing the combination cane and grabber tool.

Reference will now be made in detail to the present embodiments of the combination cane and grabber tool, examples of which are illustrated in the accompanying drawings, wherein like reference numerals refer to like elements throughout.

FIG. 1 is a perspective view of a combination cane and grabber tool 100 according to an embodiment. This combination tool 100 can comprise a grabber component 101 and a cane component 102. In an embodiment, the grabber component 101 can be sheathed within the cane component 102 when the grabber component 101 is not in use. This configuration can be referred to as the sheathed configuration and the primary purpose of the sheathed configuration can be to facilitate the stability and movement of the user (not shown in FIG. 1).

In an embodiment, the cane component 102 can comprise a hollow cylindrical tube 112, comprising a hollow tube opening 115. The inner diameter and length of the hollow tube opening 115 can be of sufficient size to accommodate the grabber component 101 within the opening 115. In an embodiment, the proximal end 103 of the cane component 102 can comprise a handle portion 105 connected near the hollow tube opening 115, which can allow the user to grasp and maintain control over the cane component 102 while the grabber component 101 is in use. The distal end 104 of the cane component 102 can be closed and comprise a cap 116 or other similar gripping feature designed to avoid slippage.

In an embodiment, the grabber component 101 can comprise a grabber handle 108, a grasping mechanism 110, a grabber body 109, and a gripping mechanism 111. In an embodiment, only the grasping mechanism 110 and handle of the grabber component 101 will remain visible while sheathed in the cane component 102, which can be made of a metal, plastic, composite material, or any other suitable material FIG. 1b is a perspective view of a grabber handle 108 of a combination cane and grabber tool 100, according to an embodiment. A source of illumination 135 can be attached to the grasping mechanism 110.

FIG. 1c is a perspective view of a distal end 104 of a combination cane and grabber tool 100, according to an embodiment. In an embodiment, the cane component 102 can be telescoping to adjust for variations in the user's height. As shown, the adjustment in length can be performed by a peg 150 and hole 151 arrangement 152, but the adjustment can also be accomplished by a latching mechanism, a screw mechanism, or other type of telescoping system.

Figure 2:
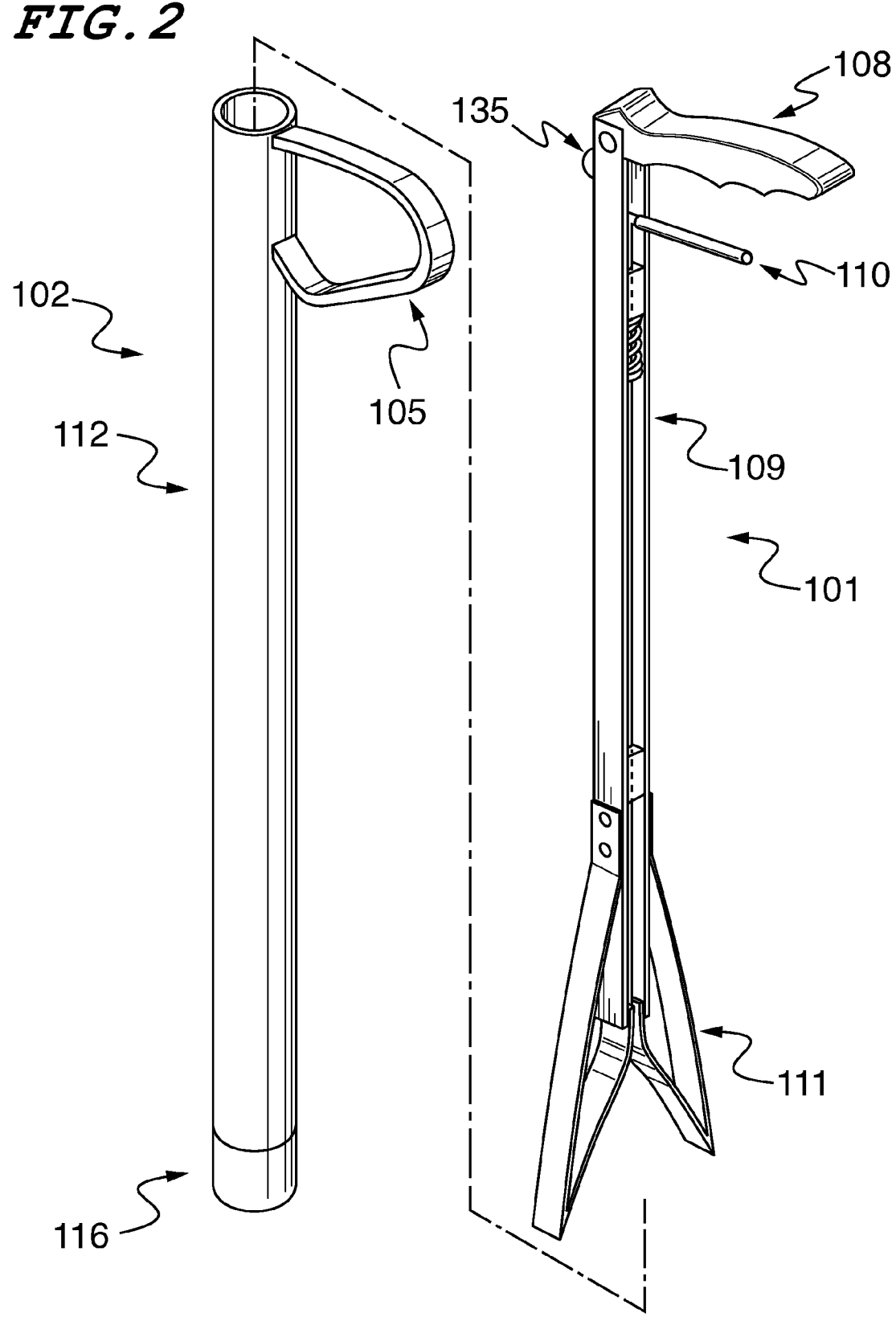
FIG. 2 is a perspective view of a combination cane and grabber tool according to an embodiment, wherein the cane component is separated from the grabber component.

FIG. 2 is a perspective view of a combination cane and grabber tool 100, wherein the grabber component 101 has been separated from the cane component 102, according to an embodiment. In an embodiment, the cane component 102 can comprise a hollow cylindrical tube 112, comprising a hollow tube opening 115, but alternate embodiments can comprise a hollow rectangular tube, comprising a hollow rectangular tube opening, with sufficient diameter and length to admit the grabber component 101. In an embodiment, the cane component 102 can comprise a handle 105 connected to the cylinder 112 in an L-junction, but in an alternate embodiment, the handle 105 can be bisected by the proximal end of the cane component 102, forming a T-junction. The handle 105 of the cane component 102 can be designed to be grasped by a single hand while the grabber component 101 is unsheathed and in use. In an embodiment, the cane handle 105 shown can be a flattened toroid, but could also be made in a variety of shapes, including a saddled bar, a solid cylinder, or a spherical knob. The cane component 102 can be made of metal or a composite material. The distal end 104 of the cane component 102 can be closed and covered with a cap 116, or other similar gripping feature, designed to avoid slips and falls while weight-bearing.

In an embodiment, the cane component 102 can be telescoping to adjust for variations in the user's height. The adjustment in length can be performed by a peg 150 and hole 151 arrangement 152, but the adjustment can also be accomplished by a latching mechanism, a screw mechanism, or other type of telescoping system.

In an embodiment, the grabber component 101 can comprise a grabber handle 108, a grasping mechanism 110, a grabber body 109, and a gripping mechanism 111. In an embodiment, the grabber handle 108 and grasping mechanism 110 can be attached to the grabber body 109 in an L-fashion. A source of illumination 135 can be attached to the grasping mechanism 110. The grabber handle 108 can be indented to conform to a human hand's grasp, but could alternatively be made without indentations, or in a cylindrical form. In an alternate embodiment, the handle 108 could be clad with a gripping material.

Figure 3:
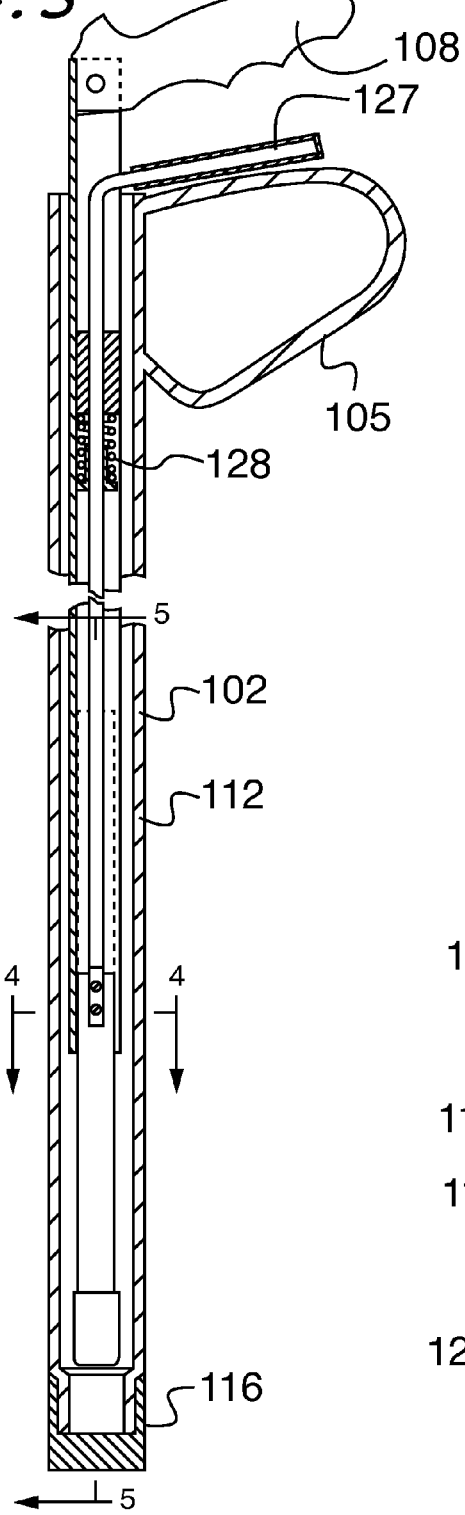
FIG. 3 is a cross sectional side view of a combination cane and grabber tool according to an embodiment.

FIG. 3 is a cross sectional side view of a combination cane and grabber tool according to an embodiment. In an embodiment, the grasping mechanism 110 can comprise a grabber handle 108, a grasping handle 127, a tensional element 117, a grabber body 109, and a spring 128. The grabber handle 108 can be connected to the grabber body 109, while the grasping handle 127 can be connected to the tensional element 117. A source of illumination 135 can be attached to the grasping mechanism 110.

In an embodiment, the cane component 102 can comprise a hollow cylindrical tube 112, comprising a hollow tube opening 115, but alternate embodiments can comprise a hollow rectangular tube, comprising a hollow rectangular tube opening, with sufficient diameter and length to admit the grabber component 101.

In an embodiment, the cane component 102 can be telescoping to adjust for variations in the user's height. The adjustment in length can be performed by a peg 150 and hole 151 arrangement 152, but the adjustment can also be accomplished by a latching mechanism, a screw mechanism, or other type of telescoping system.

Figure 4:
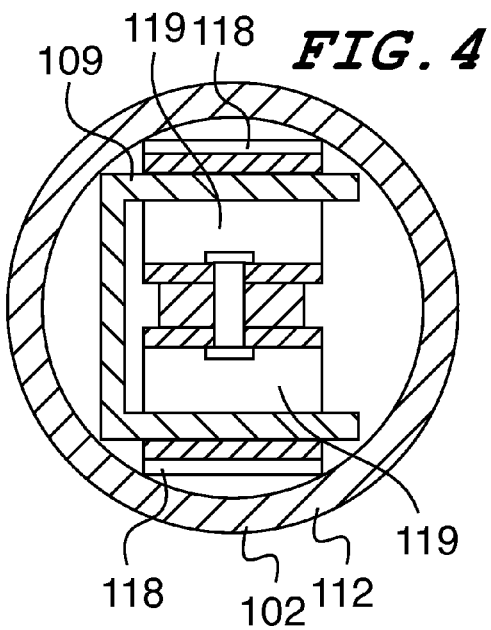
FIG. 4 is a cross-sectional top-down view of a combination cane and grabber tool according to an embodiment.

FIG. 4 is a cross-sectional top-down view of a combination cane and grabber tool according to an embodiment. In an embodiment, the hollow cylindrical tube 112 of the cane component 102 is of such as size as to admit the insertion of the grabber body 109. From this view, the inner gripping material 119 and the outer gripping material 118 are in their contracted state.

Figure 5:
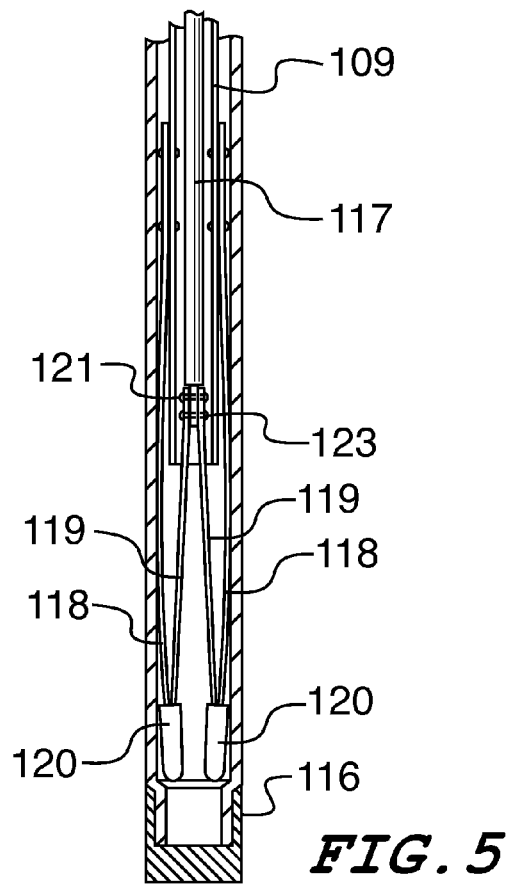
FIG. 5 is a cross-sectional front view of a combination cane and grabber tool according to an embodiment.

FIG. 5 is a cross-sectional front view of a combination cane and grabber tool according to an embodiment. In an embodiment, the gripping mechanism 111 can comprise a grabber body 109, a tensional element 117, outer gripping material 118, inner gripping material 119, and points of contact 120. The distal end 121 of the tensional element 117 can be connected to the proximal ends 123 of the inner gripping material 119. The distal end 124 of the inner gripping material 119 and the distal end 126 of the outer gripping material 118 can be symmetrically joined and the junction can be encased by the point of contact 120. The proximate ends 125 of the outer gripping material 118 can be connected to the grabber body 109 to provide a flexion point.

In an embodiment, the cane component 102 can be telescoping to adjust for variations in the user's height. As shown, the adjustment in length can be performed by a peg 150 and hole 151 arrangement 152, but the adjustment can also be accomplished by a latching mechanism, a screw mechanism, or other type of telescoping system.

FIG. 6 is a perspective view of a combination cane and grabber tool according to an embodiment, demonstrating the initial step of separating the cane and grabber components. In an embodiment, the user 141, when wanting to separate the grabber component 101 from the cane component 102, can hold the grabber handle 108 in one hand and the cane handle 105 in the other hand. Pulling in opposite motions, the user 141 can unsheathe the grabber component 101 from the cane component 102.

FIG. 7 is a perspective view of a combination cane and grabber tool according to an embodiment, demonstrating the separation of the cane and grabber components. As the grabber component 101 is being unsheathed, the user 141 can maintain control of the cane component 102 by utilizing the cane handle 105.

FIG. 8 is a front view of a combination cane and grabber tool, wherein the cane component has been removed and a grabber component remains and is at rest, according to an embodiment. In an embodiment, the grabber component 101 can comprise a grabber handle 108, a grasping mechanism 110, a grabber body 109, and a gripping mechanism 111. In an embodiment, the grabber handle 108 and grasping mechanism 110 can be attached to the grabber body 109 in an L-fashion. The grabber handle 108 can be indented to conform to a human hand, but could alternatively be made without indentations, or in a cylindrical form. In an alternate embodiment, the handle 108 could be clad with a gripping material.

In an embodiment, the grasping mechanism 110 can comprise a grabber handle 108, a grasping handle 127, a tensional element 117, a grabber body 109, and a spring 128. The grabber handle 108 can be connected to the grabber body 109, while the grasping handle 127 can be connected to the tensional element 117.

FIG. 9 is a front view of a combination cane and grabber tool, wherein the cane component has been removed and a grabber component remains and is in operation, according to an embodiment. In an embodiment, as the grasping mechanism 110 is manually engaged, the tensional element 117 can transmit a tension force along its length, which can raise the proximal ends 123 of the inner gripping material 119. Because the outer gripping material 118 can be connected to the body 109 of the grabbing component 101, the gripping mechanism 111 flexes inwards, bringing the points of contact 120 towards each other, creating a gripping force which can maintain a hold on a desired object for as long as the grasping mechanism 110 is engaged.

Figure 10:
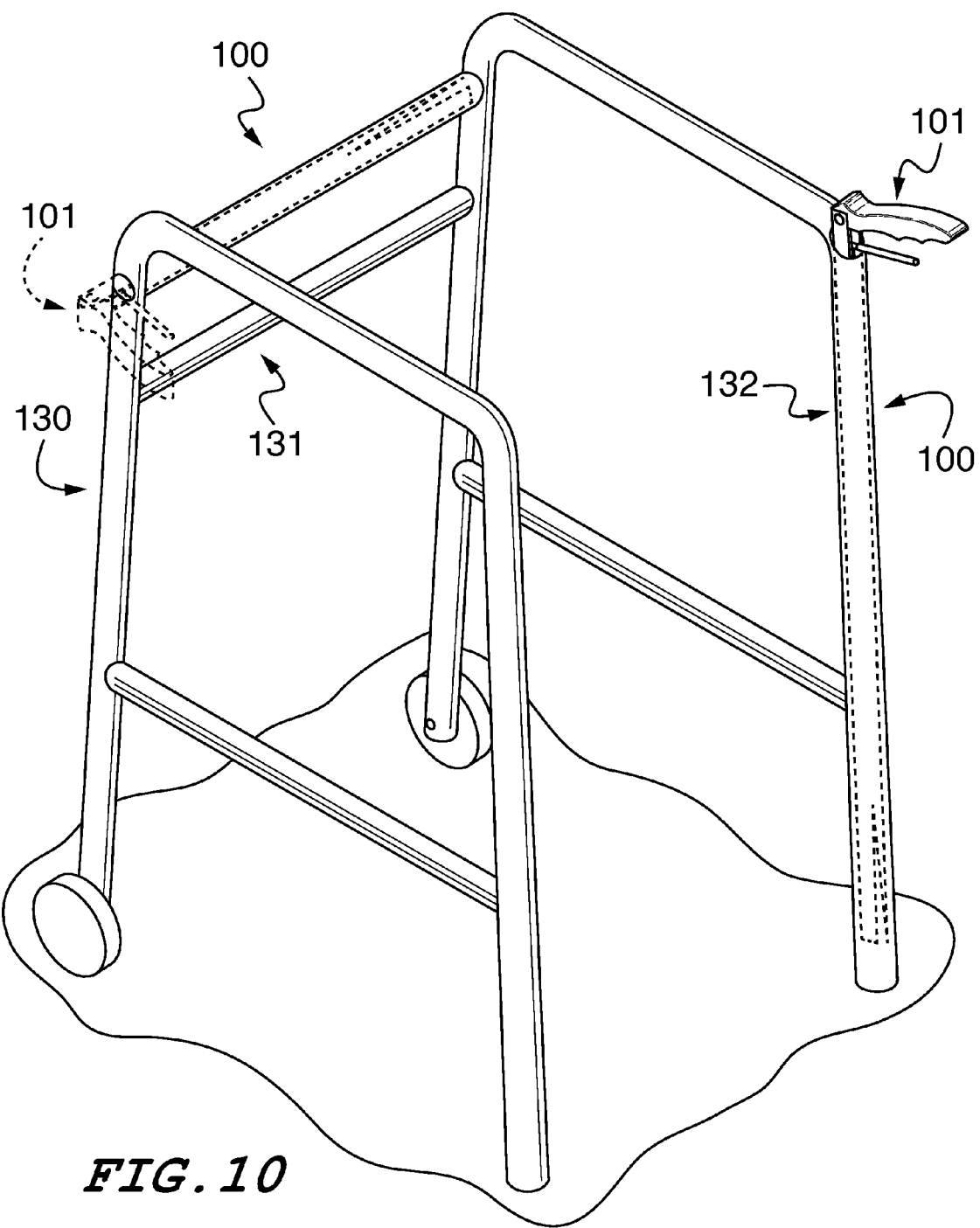
FIG. 10 is a perspective view of a combination cane and grabber tool, wherein the cane component of the tool has been made a part of a walker support, according to an alternate embodiment.

FIG. 10 is a perspective view of a combination cane and grabber tool 100, wherein the cane component 102 of the combination tool 100 has been incorporated into a walker support 130, according to an alternate embodiment. In an alternate embodiment, the grabber component 101 can remain the same. However, the cane component 102 can be integrated into the walker support 130, either as a cross-support beam 131, or as a structural leg 132 of the walker support 130. The function of the walker support 130 can remain functionally the same as the cane component 102, but, with four weight-bearing points instead of one, provide much more support to the user of the device.

In an embodiment, the structural legs 132 can be telescoping to adjust for variations in the user's height. The adjustment in length can be performed by a peg 150 and hole 151 arrangement 152, but the adjustment can also be accomplished by a latching mechanism, a screw mechanism, or other type of telescoping system.

Although the present tools have been described in terms of exemplary embodiments, none is limited thereto. Rather, the appended claims should be construed broadly, to include other variants and embodiments of the present tools, which may be made by those skilled in the art without departing from the scope and range of equivalents of either the tools or the methods for using such tools.

What is claimed is:

1. A combination cane and grabber tool, comprising:
a cane component comprising a hollow body section, having a proximate end and a distal end, said proximate end being defined by a rim and having a loop-shaped cane handle;
a grabber component comprising
a grabber body, comprising
a grasping end comprising a grasping mechanism having a grabber handle attached to the grabber body, and a grasping handle attached to a tensional element with upper and lower ends, and a spring between the upper and lower ends, the grasping handle positioned between the loop-shaped cane handle and the grabber handle, the grasping handle and the loop-shaped cane handle all protruding in a direction perpendicular to the hollow body section; and
a gripping end, the gripping end comprising a gripping mechanism having inner gripping material connected to the tensional element and an outer gripping material connected to the grabber body;
wherein the hollow body section is substantially the same length as the grabber body and the gripping end, is able to receive substantially the same length as the grabber body and the gripping end, and the grabber component is configured to substantially fit within the hollow body section of the cane component.

2. The combination cane and grabber tool as recited in claim 1, wherein said distal end of said cane component is covered by a non-slip cap.

3. The combination cane and grabber tool as recited in claim 1, wherein said cane component is telescoping in length.

4. The combination cane and grabber tool as recited in claim 1, wherein said grabber component further comprises an illumination device, attached to the grasping end of the grabber component.

5. The combination cane and grabber tool as recited in claim 1, wherein said grasping end powers the gripping end mechanically.

6. A method of using a combination cane and grabber device, comprising the operations of:
providing a combination cane and grabber tool, the tool, comprising
a cane component comprising a hollow body section, having a proximate end and a distal end, said proximate end being defined by a rim and having a loop-shaped cane handle;
a grabber component comprising
a grabber body, comprising:
a grasping end comprising a grasping mechanism having a grabber handle attached to the grabber body, and a grasping handle attached to a tensional element with upper and lower ends and a spring between the upper and lower ends, the grasping handle positioned between the loop-shaped cane handle and the grabber handle, the grasping handle and the loop-shaped cane handle all protruding in a direction perpendicular to the hollow body section; and
a gripping end, the gripping end comprising a gripping mechanism having inner gripping material connected to the tensional element and an outer gripping material connected to the grabber body;
wherein the hollow body section is substantially the same length as the grabber body and the gripping end, is able to receive substantially the same length as the grabber body and the gripping end, and the grabber component is configured to substantially fit within the hollow body section of the cane component;
providing a user having a first hand and a second hand;
providing an object;
holding the cane component in the first hand;
holding the grabber component in the second hand;
unsheathing the grabber component from the cane component;
using the grabber component to obtain the object with the second hand while supporting with the cane component using the first hand.

* * * * *